(12) United States Patent
Li et al.

(10) Patent No.: US 10,583,537 B2
(45) Date of Patent: Mar. 10, 2020

(54) TOOL FOR ADJUSTING PRESSING HEADS OF AUXILIARY WELDING MACHINE AND METHOD FOR OPERATING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Jianchao Li, Beijing (CN); Han Xiao, Beijing (CN); Xinlong Zhao, Beijing (CN); Chengyu Song, Beijing (CN); Long Zhao, Beijing (CN); Xinming Duan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 625 days.

(21) Appl. No.: 15/202,857

(22) Filed: Jul. 6, 2016

(65) Prior Publication Data
US 2017/0087680 A1    Mar. 30, 2017

(30) Foreign Application Priority Data

Sep. 29, 2015  (CN) .......................... 2015 1 0634753

(51) Int. Cl.
*B23Q 3/18* (2006.01)
*B23K 26/035* (2014.01)
(Continued)

(52) U.S. Cl.
CPC .............. *B23Q 3/18* (2013.01); *B23K 26/037* (2015.10); *B23K 37/0408* (2013.01);
(Continued)

(58) Field of Classification Search
CPC .................. B23K 26/037; B23K 37/00; B23K 37/04–047; B65G 13/11; B65G 13/12; B23Q 3/18–186
See application file for complete search history.

(56) References Cited

U.S. PATENT DOCUMENTS 2,174,193 A * 9/1939 Mickelson ............. B65H 57/14
 193/35 C
2,309,723 A * 2/1943 Wilson ................... B65G 13/08
 193/35 C
(Continued)

FOREIGN PATENT DOCUMENTS

CN 101011870 A 8/2007
CN 202592893 U 12/2012
(Continued)

OTHER PUBLICATIONS

First Chinese Office Action dated May 31, 2016; Appln. No. 201510634753.2.

*Primary Examiner* — Tyrone V Hall, Jr.
(74) *Attorney, Agent, or Firm* — Ladas & Parry, LLP; Hermine Valizadeh

(57) ABSTRACT

A tool configured for adjusting a plurality of pressing heads of an auxiliary welding machine and a method for operating the same are disclosed. The tool includes: a support; a limiting mechanism disposed on the support, wherein the limiting mechanism has a limiting groove for receiving a top end of at least one of the plurality of pressing head. It is possible to adjust the plurality of pressing heads of the auxiliary welding machine more conveniently and accurately using the above tool.

19 Claims, 4 Drawing Sheets

(51) Int. Cl.
  *B23K 37/04*   (2006.01)
  *B23Q 3/02*   (2006.01)
  *B23K 101/42*   (2006.01)

(52) U.S. Cl.
  CPC ............ *B23K 37/0435* (2013.01); *B23Q 3/02* (2013.01); *B23K 2101/42* (2018.08)

(56) References Cited

U.S. PATENT DOCUMENTS

| | | | | |
|---|---|---|---|---|
| 2,733,330 A * | 1/1956 | Blewett | ............ | B23K 37/0426 16/26 |
| 2,770,032 A * | 11/1956 | Kelly | ............ | B25B 27/00 29/235 |
| 2,920,581 A * | 1/1960 | Cook | ............ | B65G 9/002 104/107 |
| 3,829,112 A * | 8/1974 | Spademan | ............ | A63C 9/001 280/636 |
| 3,856,075 A * | 12/1974 | Larkin | ............ | B22D 33/005 164/323 |
| 4,203,511 A * | 5/1980 | Uhing | ............ | B65G 35/063 198/458 |
| 4,248,157 A * | 2/1981 | Evans | ............ | B61B 1/005 104/246 |
| 5,192,013 A * | 3/1993 | Abbey, III | ............ | B21C 37/0811 228/125 |
| 5,482,377 A * | 1/1996 | Osawa | ............ | B23Q 1/28 29/281.5 |
| 5,735,378 A * | 4/1998 | Sundquist | ............ | B65B 43/39 193/35 C |
| 5,837,967 A * | 11/1998 | Sperling | ............ | B23K 9/287 219/125.1 |
| 6,196,375 B1 * | 3/2001 | Cozza | ............ | B65G 21/2054 193/35 C |
| 6,814,535 B1 * | 11/2004 | Maness | ............ | B65G 65/00 414/807 |
| 7,699,274 B2 * | 4/2010 | Riibe | ............ | F16L 1/09 248/55 |
| 8,646,731 B2 * | 2/2014 | Burles | ............ | F16L 3/16 144/287 |
| 2012/0112032 A1 * | 5/2012 | Kohen | ............ | B60N 2/072 248/430 |
| 2015/0165555 A1 * | 6/2015 | Rivard | ............ | B23K 26/262 219/121.63 |
| 2015/0258641 A1 * | 9/2015 | Stermann | ............ | B23K 20/12 228/2.1 |

FOREIGN PATENT DOCUMENTS

| | | |
|---|---|---|
| CN | 103885213 A | 6/2014 |
| CN | 203695666 U | 7/2014 |
| CN | 204064153 U | 12/2014 |
| CN | 204125046 U | 1/2015 |
| JP | 04157092 A | 5/1992 |

\* cited by examiner

TOOL FOR ADJUSTING PRESSING HEADS OF AUXILIARY WELDING MACHINE AND METHOD FOR OPERATING THE SAME

FIELD OF THE ART

Embodiments of the disclosure relate to the field of display fabrication technologies, more particularly, to a tool for adjusting a plurality of pressing heads of an auxiliary welding machine and a method for operating the same.

BACKGROUND

During the repairing process of a thin film transistor liquid crystal display (TFT-LCD) module, long pressing heads and short pressing heads are used to fix a substrate to be welded in a position. A welding machine typically has a plurality of pressing heads which are attached to a support. The pressing heads need to be replaced to meet the fabrication requirements of products having different sizes, and the plurality of pressing heads need to be horizontally calibrated to meet the requirements of production process and to guarantee the plurality of pressing heads have the same press level during the fabrication process. There is an independent fixing position for each of the plurality of pressing heads. Moreover, spaces between individual independent pressing heads are relatively large. The plurality of pressing heads are connected to each other through sliding rod, and the spaces may be increased according to the real production. However, the adjusting process for the plurality of pressing heads respectively is complicated and time consuming.

SUMMARY

A first aspect of the invention provides a tool for adjusting a plurality of pressing heads of an auxiliary welding machine, comprising: a support; a limiting mechanism disposed on the support, wherein the limiting mechanism comprises a limiting groove for receiving a top end of at least one of the plurality of pressing heads.

A second aspect of the invention provides a method for operating a tool configured for adjusting a plurality of pressing heads of an auxiliary welding machine, wherein the tool comprises: a support; a limiting mechanism disposed on the support, the limiting mechanism comprises a limiting groove for receiving a top end of at least one of the plurality of pressing heads; and the method comprises: placing the top end of the at least one of pressing heads in the limiting groove of the limiting mechanism such that the pressing head in the limiting groove is fixed in place; and moving the limiting mechanism, adjusting and fixing rest of the pressing heads such that the plurality of the pressing heads each passes through the limiting groove.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. Based on the described drawings herein, those skilled in the art can obtain other drawing(s) without any inventive work.

DETAILED DESCRIPTION

Figure 1:
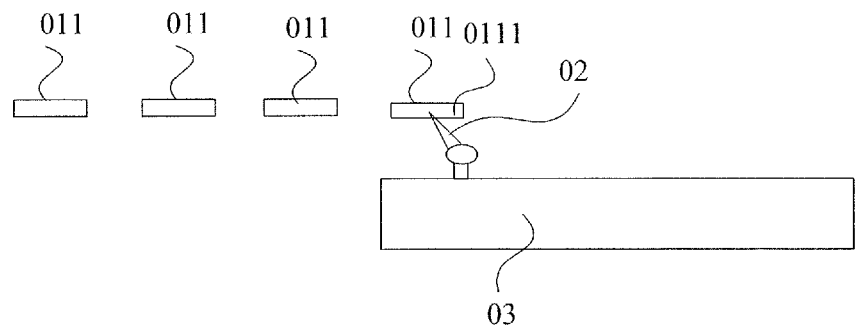
FIG. 1 schematically illustrates the principle of adjusting a plurality of pressing heads.

FIG. 1 schematically illustrates the principle of adjusting a plurality of pressing heads of an auxiliary welding machine. The adjusting method is as follows: fixing a dial gauge 02 on a machine platform 03 for supporting a device to be repaired; moving the machine platform 03 horizontally so as to allow a gauge head of the dial gauge 02 to contact an external side 0111 of a top end 011 of each of the pressing heads; and a horizontal validation is realized by repeatedly moving the dial gauge 02 on the external side 0111 of the top end 011 of the pressing head in horizontal direction; once it is confirmed that there is horizontal deviation with the pressing head, adjusting a direction of the pressing head, then the machine platform 03 is moved repeatedly until there is no gap or deviation between the gauge head of the dial gauge 02 and the external side 0111. As the dial gauge 02 needs to move between the plurality of pressing heads repeatedly in horizontal direction, it may cause a datum drift. Moreover, as there is no limit to the top end of the pressing head in a vertical direction orthogonal to the machine platform, when the pressing head is fastened using a screw after the calibration is finished, an applied force of torsion is applied to the pressing head during the fastening process of the screw, thereby causing a deviation again when the pressing head is fixed.

Figure 2:
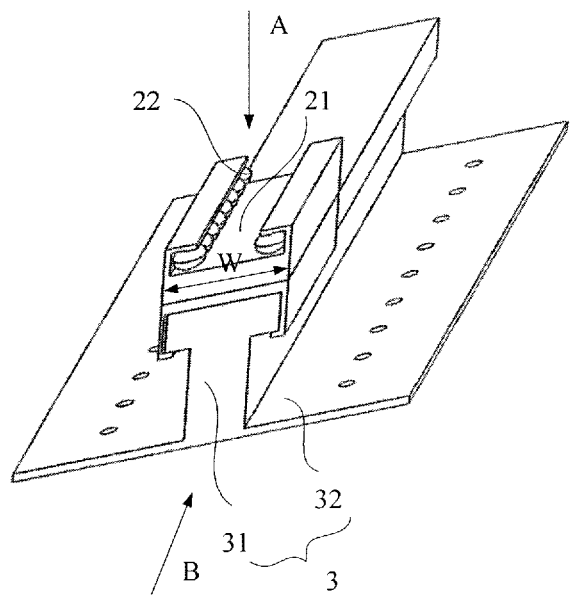
FIG. 2 schematically illustrates a tool for adjusting a plurality of pressing heads of an auxiliary welding machine in accordance with an embodiment of the disclosure.
Figure 3:
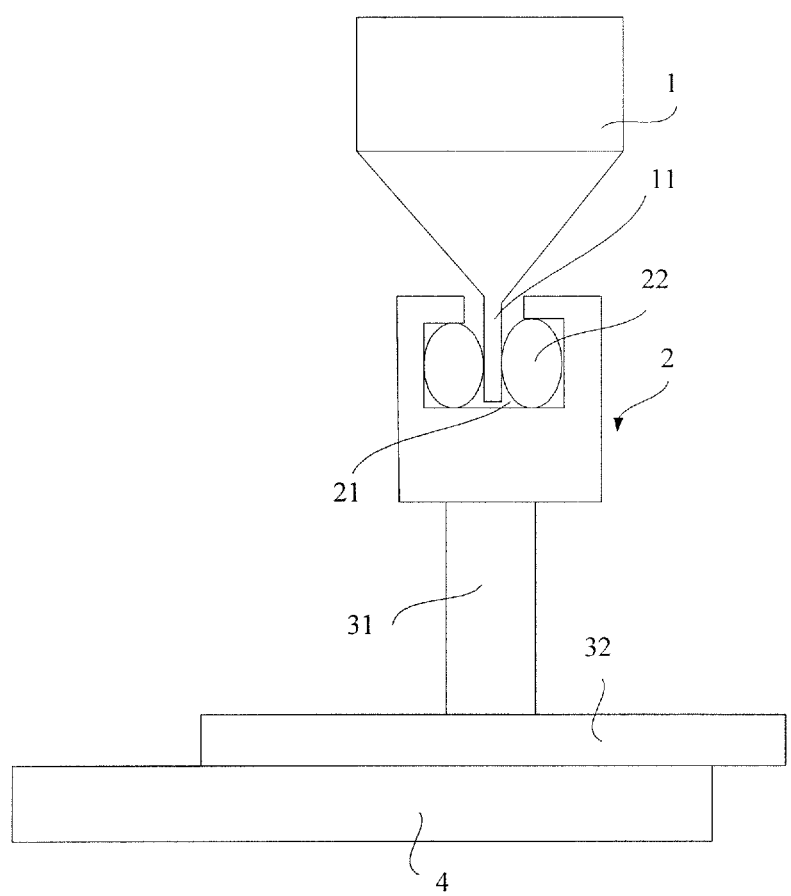
FIG. 3 schematically illustrates a status of the tool in FIG. 2 when being used.

FIG. 2 schematically illustrates a tool for adjusting a plurality of pressing heads of an auxiliary welding machine in accordance with an embodiment of the disclosure. FIG. 3 schematically illustrates a status of the tool in FIG. 2 when used. The embodiment of the disclosure provides a tool for adjusting a plurality of pressing heads of an auxiliary welding machine, and the tool comprises:

a support 3;

a limiting mechanism 2 disposed on the support 3, the limiting mechanism 2 comprises a limiting groove 21 for receiving a top end 11 of at least one of the plurality of pressing heads 1.

The limiting mechanism 21 is configured for limiting the top end 11 of the pressing head 1 in the limiting groove 21 along a direction orthogonal to mounting surfaces of the plurality of pressing heads 1. Herein, the "mounting surface" refers to the left or right side of the top end 11 of FIG. 3, and a direction orthogonal to the mounting surface is the horizontal direction in FIG. 3.

It is possible to limit the two sides of each of the pressing heads using the tool provided by the embodiment of the disclosure. During the adjusting process, taking a distance from a central line of width of the limiting groove 21 to one of the mounting surfaces as a reference criterion, a mounting position of other pressing heads 1 is adjusted respectively such that the distance between the corresponding mounting surface of each pressing heads 1 and the central line of the limiting groove 21 is equal to the reference criterion. Due to the above fact, the tool provided by the embodiment of the disclosure can improve the convenience and accuracy of the calibration and adjusting.

The limiting groove 21 may have various structures.

In at least some of the embodiments, the limiting groove 21 is a T-shaped groove. That is, a cross section of the limiting groove is T-shaped, the T-shaped groove is extended in a length direction and the T-shaped groove has openings at both ends along the length direction. As an example illustrated in FIG. 4, both ends of the T-shaped groove 21 are open along a horizontal direction. In at least some of the embodiments, a plurality of balls 22 is disposed on each of the two sides of the T-shaped groove along a width direction (i.e., perpendicular to the length direction), and a space between the two balls 22 oppositely arranged along the width direction of the T-shaped groove is configured for limiting the top end 11 of the pressing head 1. The disposition of the balls 22 can reduce the friction between an internal wall of the limiting groove 21 and the top end of the pressing head 1 when the pressing head 1 slides in the limiting groove 21, thereby reducing the damage from the internal wall of the groove to the top end 11 of the pressing head 1.

Figure 6:
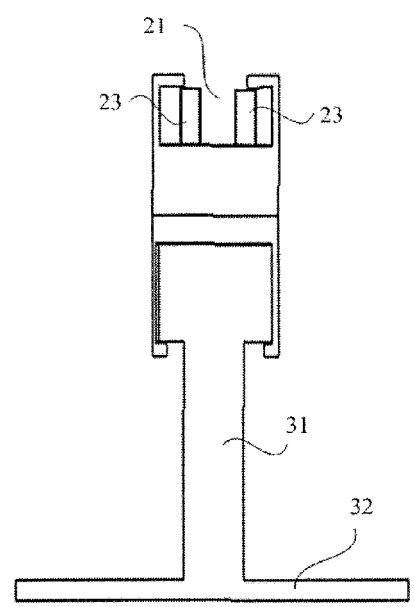
FIG. 6 schematically illustrates another tool for adjusting a plurality of pressing heads of an auxiliary welding machine in accordance with an embodiment of the disclosure.

In at least some of the embodiments, the limiting mechanism 2 further comprises two clamp plates 23 arranged as opposed to each other, and a gap between the two clamp plates 23 forms the limiting groove 21, as illustrated in FIG. 6. The positions of the two clamp plates 23 may be adjustable such that the limiting mechanism 2 can adapt to a thickness of the top end 11 of the pressing head 1.

In at least some of the embodiments, the support is movable along a vertical direction. The specific structure of the support may be various. As an example, as illustrated in FIG. 3, the support 3 comprises:
 a base 32;
 a supporting post 31 disposed on the base 32, a height of the supporting post 31 is adjustable, that is, the supporting post 31 is movable along a vertical direction.

The height of the supporting post 31 may be adjusted in several ways.

In at least some of the embodiments, the supporting post 31 comprises: a plurality of supporting blocks, wherein the plurality of supporting blocks are laminated with each other to form the supporting post 31. As an example, two adjacent supporting blocks are connected to each other through fastener.

In at least some of the embodiments, the supporting post is a telescopic rod. The height of the supporting post is adjusted through drawing and retraction.

The above supporting post 31 is connected to the limiting mechanism 2 in several ways.

In at least some of the embodiments, the supporting post 31 is connected to the limiting mechanism 2 through a fastener. Such a mounting method makes it easy to disassemble.

Figure 5:
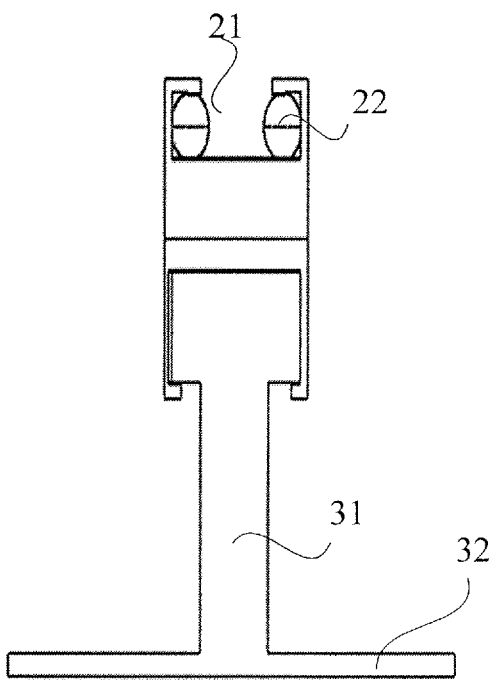
FIG. 5 schematically illustrates the tool in FIG. 2 along B direction.

As an example, as illustrated in FIG. 5, an end of the supporting post 31 close to the limiting mechanism 2 is a T-shaped male plug, and a T-shaped female receptor engaged with the T-shaped male plug is disposed on an end of the limiting mechanism 2 close to the supporting post 31.

In at least some of the embodiments, the supporting post 31 and the limiting mechanism 2 are connected to each other through screws or bolts.

Figure 4:
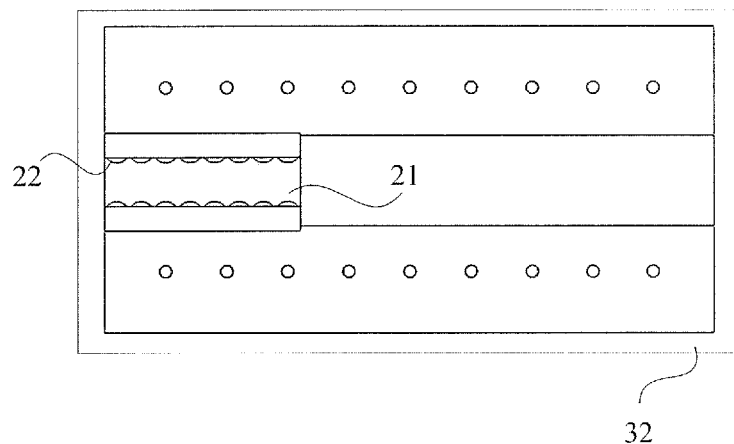
FIG. 4 schematically illustrates the tool in FIG. 2 along A direction.

In at least some of the embodiments, the limiting mechanism 2 is detachably connected to the support 3. As an example, the limiting mechanism 2 moves relative to the support 3, such as along B direction in FIG. 2. The supporting post 31 and the base 32 may be an integrally formed structure. During the adjusting process, it is possible to keep the support 3 still and allow the limiting mechanism 2 to move. Alternatively, as illustrated in FIG. 4, it is possible to move the machine platform 4 configured for receiving the support 3 so as to drive the limiting mechanism 2 to move.

An embodiment of the disclosure further provides a method for operating a tool configured for adjusting a plurality of pressing heads of an auxiliary welding machine, wherein the tool comprises: a support 3; a limiting mechanism 2 disposed on the support, the limiting mechanism 2 comprises a limiting groove 21 for receiving a top end 11 of at least one of the plurality of pressing heads 1. The operation method comprises:
 placing the top end 11 of the at least one of pressing heads 1 in the limiting groove 21 of the limiting mechanism 2 such that the pressing head 1 in the limiting groove 21 is fixed in place; and
 moving the limiting mechanism 2, adjusting and fixing rest of the pressing heads 11 such that the plurality of the pressing heads 11 all pass through the limiting groove 21.

In at least some of the embodiments, the method further comprises the following step before placing the top end 11 of the at least one of pressing heads 1 in the limiting groove 21 of the limiting mechanism 2: adjusting a height of the support 3.

In at least some of the embodiments, the method further comprises the following step before placing the top end 11 of the at least one of pressing head 1 in the limiting groove 21 of the limiting mechanism 2: mounting the support 3 onto the machine platform 4. The limiting mechanism 2 is fixedly mounted on the supporting post 3. When the machine platform 4 moves, the limiting mechanism 2 moves together.

When adjusting a plurality of pressing heads 1 of an auxiliary welding machine by using the method provided by the embodiment of the disclosure, the adjusting process is relatively convenient and more accurate.

What is described above is related to the illustrative embodiments of the disclosure only and not limitative to the scope of the disclosure; the scopes of the disclosure are defined by the accompanying claims.

The present application claims the priority of Chinese Patent Application No. 201510634753.2 filed on Sep. 29, 2015, the disclosure of which is incorporated herein by reference in its entirety.

What is claimed is:
1. A tool for adjusting a plurality of pressing heads of an auxiliary welding machine, comprising:
 a support;
 a limiting mechanism disposed on the support, wherein the limiting mechanism comprises a limiting groove for receiving a top end of at least one of the plurality of pressing heads; and
 the limiting mechanism further comprises two clamp members opposed to each other, a gap is formed between the two clamp members, the limiting groove comprises the gap, and the top end of at least one of the plurality of pressing heads is disposed in the gap;
 positions of the two clamp members are adjustable so that a width of the gap is adjustable, and a direction of the width of the gap is perpendicular to an extension direction of the limiting groove, wherein
 the support comprises a base and a supporting post disposed on the base, and the supporting post is movable along a vertical direction.

2. The tool of claim 1, wherein the limiting groove is configured for limiting the pressing head along a direction orthogonal to a mounting surface of the pressing head so as to fasten the top end of the pressing head.

3. The tool of claim 1, wherein the two clamp members are two clamp plates arranged as opposed to each other, a gap between the two clamp plates forms the limiting groove, and positions of the two clamp plates are adjustable so that the width of the limiting groove is adjustable.

4. The tool of claim 1, wherein the limiting mechanism is detachably connected to the support.

5. The tool of claim 1, wherein the support is movable along a vertical direction.

6. The tool of claim 1, wherein the supporting post comprises a plurality of supporting blocks, the plurality of supporting blocks are laminated with each other to form the supporting post.

7. The tool of claim 6, wherein two adjacent supporting blocks are connected to each other through a fastener.

8. The tool of claim 1, wherein the supporting post is a telescopic rod.

9. The tool of claim 1, wherein the supporting post is connected to the limiting mechanism through a fastener.

10. The tool of claim 9, wherein a T-shaped male plug is disposed on an end of the supporting post close to the limiting mechanism, and a T-shaped female receptor engaged with the T-shaped male plug is disposed on an end of the limiting mechanism close to the supporting post.

11. The tool of claim 1, wherein the supporting post and the limiting mechanism are connected to each other through screws or bolts.

12. The tool of claim 1, wherein the limiting mechanism comprises:

a support structure comprising a flat plane; wherein the two clamp members are on the flat plane, and a cross-section view of the limiting groove along a direction perpendicular to the flat plane is T-shaped, and the groove which is T-shaped and has openings at both ends in the extension direction.

13. The tool of claim 12, wherein the support structure further comprises two cover plates on the flat plane, extending along the extension direction and opposite to each other respectively at two ends, which are along the direction of the width of the gap, of the flat plane; the two clamp members are respectively at an inner side of the two support plates, the limiting groove which is T-shaped is formed and partially surrounded by the flat plane, the two clamp members and the two cover plates.

14. The tool of claim 12, wherein the two clamp members are respectively disposed on each of two sides of the limiting groove which is T-shaped along the width direction.

15. The tool of claim 14, wherein the two clamp members are two rows of balls opposed to each other, or the two clamp members are two clamp plates arranged as opposed to each other.

16. A method for operating a tool, wherein the tool is configured for adjusting a plurality of pressing heads of an auxiliary welding machine and comprises: a support; a limiting mechanism disposed on the support, wherein the limiting mechanism comprises a limiting groove for receiving a top end of at least one of the plurality of pressing heads; the limiting mechanism further are two clamp members arranged as opposed to each other, a gap is formed between the two clamp members, the limiting groove comprises the gap, and the top end of at least one of the plurality of pressing heads is disposed in the gap, wherein positions of the two clamp members are adjustable so that a width of the gap is adjustable, and a direction of the width of the gap is perpendicular to an extension direction of the limiting groove; and the method comprises:

adjusting the positions of the two clamp members to adjust the width of the gap;

placing the top end of the at least one of pressing heads in the limiting groove of the limiting mechanism such that the pressing head in the limiting groove is fixed in place; and moving the limiting mechanism, adjusting and fixing rest of the pressing heads such that each of the plurality of the pressing heads passes through the limiting groove, wherein the two clamp members are two rows of balls arranged as opposed to each other.

17. The method of claim 16, wherein before placing the top end of the at least one of pressing heads in the limiting groove of the limiting mechanism, the method further comprises: adjusting a height of the support.

18. The method of claim 16, wherein before placing the top end of the at least one of pressing heads in the limiting groove of the limiting mechanism, the method further comprises: mounting the support onto a machine platform.

19. A tool for adjusting a plurality of pressing heads of an auxiliary welding machine, comprising:

a support;

a limiting mechanism disposed on the support, wherein the limiting mechanism comprises a limiting groove for receiving a top end of at least one of the plurality of pressing heads; and the limiting mechanism further comprises two clamp members opposed to each other, a gap between the two clamp members forms the limiting groove, positions of the two clamp members are adjustable so that a width of the limiting groove is adjustable, and a direction of the width of the limiting groove is perpendicular to an extension direction of the limiting groove, wherein the two clamp members are two rows of balls arranged as opposed to each other.

* * * * *